US012664013B2

(12) United States Patent

Sherwin, Jr.

(10) Patent No.: US 12,664,013 B2

(45) Date of Patent: Jun. 23, 2026

(54) MAPPING VIRTUAL PROCESSOR CORES TO HETEROGENEOUS PHYSICAL PROCESSOR CORES

(71) Applicant: Microsoft Technology Licensing, LLC, Redmond, WA (US)

(72) Inventor: Bruce J. Sherwin, Jr., Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 566 days.

(21) Appl. No.: 18/302,707

(22) Filed: Apr. 18, 2023

(65) Prior Publication Data

US 2024/0354140 A1 Oct. 24, 2024

(51) Int. Cl.
*G06F 9/455* (2018.01)

(52) U.S. Cl.
CPC .................... *G06F 9/45558* (2013.01); *G06F 2009/45579* (2013.01)

(58) Field of Classification Search
CPC ....... G06F 9/45558; G06F 2009/45579; G06F 2209/501; G06F 2209/5021; G06F 9/4856; G06F 9/5044; G06F 9/5077
See application file for complete search history.

(56) References Cited

U.S. PATENT DOCUMENTS

| | | | |
|---|---|---|---|
| 8,695,007 B2 | 4/2014 | Wada et al. | |
| 2007/0255936 A1 | 11/2007 | Stemen | |

| | | | |
|---|---|---|---|
| 2010/0162242 A1 | 6/2010 | Grouzdev | |
| 2012/0278800 A1 | 11/2012 | Nicholas | |
| 2014/0183957 A1 | 7/2014 | Duchesneau | |
| 2014/0298340 A1 | 10/2014 | Imaizumi | |
| 2015/0347166 A1 | 12/2015 | Noel et al. | |
| 2016/0239324 A1 | 8/2016 | Tsirkin et al. | |
| 2018/0365042 A1 | 12/2018 | Tsirkin | |
| 2019/0278714 A1* | 9/2019 | Poothia ................. G06F 12/109 | |
| 2020/0104128 A1* | 4/2020 | Opferman ........... G06F 9/30003 | |

(Continued)

OTHER PUBLICATIONS

Chen et al., "ClientVisor: Leverage COTS OS Functionalities for Power Management in Virtualized Desktop Environment", Operating Systems Review, ACM, New York, NY, US, vol. 43, No. 3, Jul. 31, 2009, pp. 62-71.

(Continued)

*Primary Examiner* — Kenneth Tang

(74) *Attorney, Agent, or Firm* — Workman Nydegger

(57) ABSTRACT

Mapping virtual processor cores to heterogeneous physical processor cores. A device determines that a processor system has a heterogeneous set of processor cores, which include a first physical core with a first attribute and a second physical core with a second capability different from the first capability. The device associates a plurality of physical cores with a virtual machine (VM). This includes the device associating the first physical core with a first virtual core, which includes, based on the first physical core having the first capability, exposing to the VM that the first virtual core has a first feature set. This also includes the device associating the second physical core with a second virtual core of the VM, which includes, based on the second physical core having the second capability, exposing to the VM that the second virtual core has a second feature set different from the first feature set.

20 Claims, 4 Drawing Sheets

100b

(56) References Cited

U.S. PATENT DOCUMENTS

| | | | |
|---|---|---|---|
| 2020/0341791 A1 | 10/2020 | Tsirkin | |
| 2020/0401440 A1* | 12/2020 | Sankaran | G06F 9/30014 |
| 2021/0096896 A1 | 4/2021 | Das | |
| 2021/0216344 A1 | 7/2021 | Tsirkin | |
| 2021/0279107 A1 | 9/2021 | Qu | |
| 2021/0342173 A1 | 11/2021 | Tsirkin | |
| 2022/0004420 A1* | 1/2022 | Warkentin | G06F 11/3409 |
| 2022/0113785 A1 | 4/2022 | Lu | |
| 2022/0156362 A1 | 5/2022 | Takahashi | |
| 2022/0164196 A1 | 5/2022 | Beckett | |
| 2023/0342477 A1 | 10/2023 | Suryanarayana | |
| 2024/0220446 A1* | 7/2024 | Kirubakaran | G06F 9/5044 |
| 2024/0354138 A1 | 10/2024 | Sherwin, Jr. | |
| 2024/0354139 A1 | 10/2024 | Sherwin, Jr. | |

OTHER PUBLICATIONS

International Search Report and Written Opinion received for PCT Application No. PCT/US2024/023489, (MS# 412061-PCT01) Jun. 27, 2024, 17 pages.

International Search Report and Written Opinion received for PCT Application No. PCT/US2024/023490, (MS#412062-PCT01) Jul. 15, 2024, 15 pages.

International Search Report and Written Opinion received for PCT Application No. PCT/US2024/023515, (MS# 412882-PCT01) Jul. 4, 2024, 12 pages.

Nathuji, et al., "Virtualpower: Coordinated Power Management in Virtualized Enterprise Systems," Operating Systems Review, ACM, New York, NY, US, vol. 41, No. 6, Oct. 14, 2007, pp. 265-278.

Tang, et al., "Demeter QoS-aware CPU scheduling to reduce power consumption of multiple black-box workloads," Proceedings of the 13th Symposium on Cloud Computing, Nov. 7, 2022, pp. 31-46.

Yang et al., "Implementation of a Green Power Management Algorithm for Virtual Machines on Cloud Computing", Sep. 2, 2011, SAT 2015, 18th International Conference, Austin, TX, USA, Lecture Notes in Computer Science, Springer, Berlin, Heidelberg, Sep. 24-27, 2015, pp. 280-294.

Non-Final Office Action mailed on Aug. 13, 2025, in U.S. Appl. No. 18/302,652 (MS#412061-US01) 24 Pages.

Non-Final Office Action mailed on Sep. 19, 2025, in U.S. Appl. No. 18/302,706, (MS#412062-US01) 38 Pages.

U.S. Appl. No. 18/302,652, filed Apr. 18, 2023.

U.S. Appl. No. 18/302,706, filed Apr. 18, 2023.

Final Office Action mailed on Jan. 28, 2026, in U.S. Appl. No. 18/302,706, (MS#412062-US01) 41 Pages.

Notice of Allowance mailed on Jan. 21, 2026, in U.S. Appl. No. 18/302,652, (MS#412061-US01) 9 Pages.

International Preliminary Report on Patentability (Chapter I) received for PCT Application No. PCT/US2024/023515, (Ms# 412882-PCT01) Oct. 30, 2025, 9 pages.

International Preliminary Report on Patentability (Chapter I/II) received for PCT Application No. PCT/US2024/023490, (Ms# 412062-PCT01) Oct. 30, 2025, 9 pages.

International Preliminary Report On Patentability received for PCT Application No. PCT/US2024/023489, (Ms# 412061-PCT01), mailed on Oct. 30, 2025, 10 pages.

* cited by examiner

100a

200

Processor Manager 118

Topology Identification 201

Processor Association 202

Topology Presentation 203

*FIG. 2*

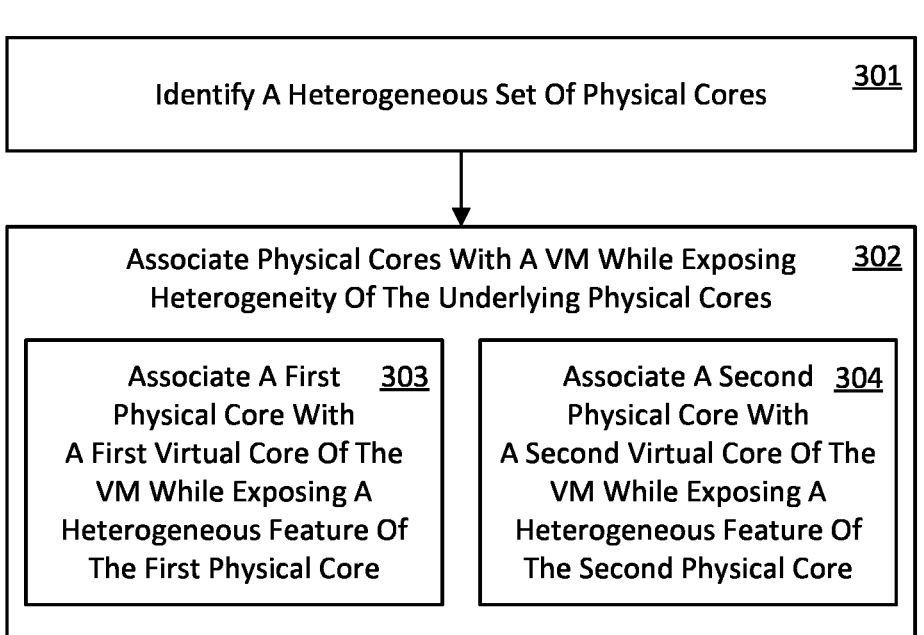

300

Identify A Heterogeneous Set Of Physical Cores        301

Associate Physical Cores With A VM While Exposing        302
Heterogeneity Of The Underlying Physical Cores Associate A First        303
Physical Core With
A First Virtual Core Of The
VM While Exposing A
Heterogeneous Feature Of
The First Physical Core Associate A Second        304
Physical Core With
A Second Virtual Core Of The
VM While Exposing A
Heterogeneous Feature Of
The Second Physical Core

FIG. 3

MAPPING VIRTUAL PROCESSOR CORES TO HETEROGENEOUS PHYSICAL PROCESSOR CORES

BACKGROUND OF THE INVENTION

Hypervisor-based virtualization technologies allocate portions of a computer system's physical resources (e.g., processor cores, physical memory regions, storage resources) into separate partitions and execute software within each partition. Hypervisor-based virtualization technologies, therefore, facilitate the creation of virtual machines (VMs) that each executes guest software, such as an OS and other software executing therein. A computer system hosting VMs is commonly called a VM host (sometimes called a "VM host node"). While hypervisor-based virtualization technologies can take a variety of forms, many use an architecture comprising a hypervisor that has direct access to hardware, and that operates in a separate execution environment from all other software in the system; a host partition that executes a host OS and a host virtualization stack; and one or more guest partitions corresponding to VMs. The host virtualization stack within the host partition manages guest partitions. Thus, the hypervisor grants the host partition greater access to the hypervisor itself and hardware resources than the access it grants to guest partitions.

Virtualization service providers operate a plurality of VM hosts to provide VM hosting services to a plurality of tenants. In doing so, virtualization service providers may collocate VMs from multiple tenants at a single VM host. Examples of virtualization service providers include AZURE, operated by MICROSOFT CORPORATION of Redmond, Washington; AMAZON WEB SERVICES (AWS), operated by AMAZON, INC. Seattle, Washington; and GOOGLE CLOUD PLATFORM (GCP), operated by GOOGLE LLC of Mountain View, California.

The subject matter claimed herein is not limited to embodiments that solve any disadvantages or that operate only in environments such as those described supra. Rather, this background is only provided to illustrate one example technology area where some embodiments described herein may be practiced.

SUMMARY OF THE INVENTION

In some aspects, the techniques described herein relate to methods, systems, and computer program products for associating physical processor cores of a physical processor system with virtual processor cores of a virtual machine (VM), including determining that the processor system has a heterogeneous set of physical processor cores, the heterogeneous set of physical processor cores including a first physical processor core with a first capability and a second physical processor core with a second capability different from the first capability; and associating a plurality of physical processor cores with a VM. Associating the plurality of physical processor cores with the VM includes associating the first physical processor core with a first virtual processor core of the VM, which includes, based on the first physical processor core having the first capability, exposing to the VM that the first virtual processor core has a first feature set); and associating the second physical processor core with a second virtual processor core of the VM, which includes, based on the second physical processor core having the second capability, exposing to the VM that the second virtual processor core has a second feature set different from the first feature set.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To describe the manner in which the advantages and features of the systems and methods described herein can be obtained, a more particular description of the embodiments briefly described supra will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which:

FIG. 2 illustrates an example of a processor manager; and

FIG. 3 illustrates a flow chart of an example of a method for associating physical processor cores of a physical processor system with virtual processor cores of a VM.

DETAILED DESCRIPTION OF THE INVENTION

Figure 1A:
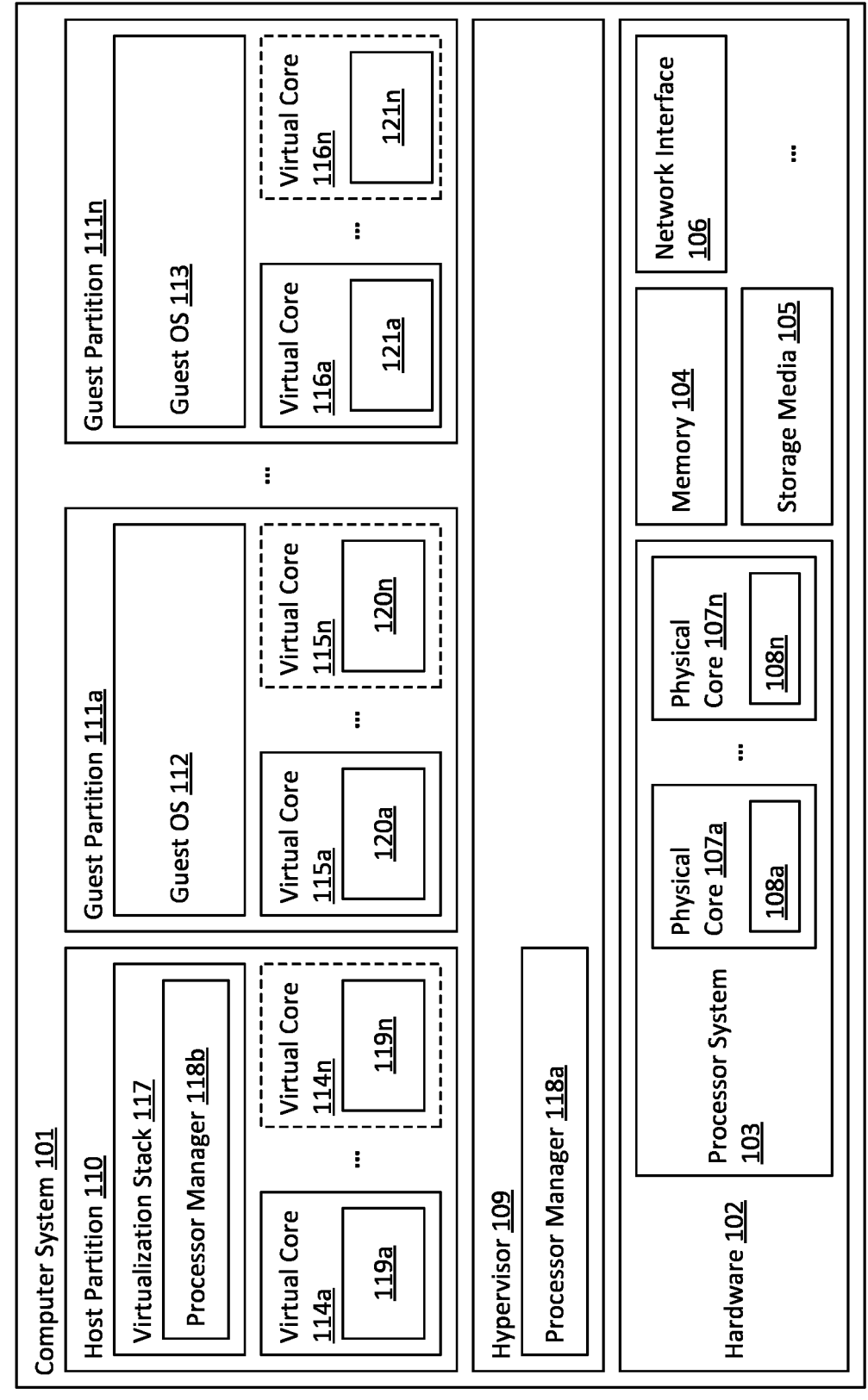
FIG. 1A illustrates an example computer architecture that facilitates mapping a virtual machine's (VM's) virtual processor cores to heterogeneous physical processor cores of a processing system.

Multiprocessing refers to using two or more central processing units (CPUs), or processors, within a single computer system (e.g., using multiple processor cores on one CPU die, using multiple CPU dies in one package, or using multiple packages in one system unit). In conventional multiprocessing computer systems, the multiple processor cores have been homogenous. That is, each processor core in the computer system is identical in capability and performance to the other processor cores in the computer system. A hypervisor treats processor cores in these homogenous multiprocessing environments as functionally identical. For example, the hypervisor may utilize preference rules to optimize performance but when associating a virtual processor core of a virtual machine (VM) with an available physical processor core, the hypervisor treats the available physical processor cores as fungible. For instance, in general, the hypervisor may associate a given virtual processor core with any physical processor core (e.g., because the supported processor feature set is identical in a homogenous processor). Example preference rules may include associating the virtual processor cores of a VM with physical processor cores that are in the same level-three cache domain (e.g., rather than using physical processor cores in different level-three cache domains), or associating the virtual processor core(s) of a VM with physical processor core(s) that are closest to a device (e.g., a storage controller, network interface card, graphics processing unit) with which the VM interacts. In any of these cases, however, the processor cores are still treated as being functionally identical.

Recently, multiprocessing computer systems have introduced heterogeneous processor cores. For example, the twelfth generation (ALDER LAKE) of the INTEL CORE line of processors introduced a heterogeneous processor architecture in which each processor core of multiple processor cores on a CPU die may either be a "performance" core (P-core) or an "efficiency" core (E-core). Similarly, the ADVANCED RISC MACHINES (ARM) architecture includes a "big.LITTLE" heterogeneous processor architecture that uses a combination of "big" cores and "LITTLE" cores on a CPU die. In general, P-cores (INTEL) and big cores (ARM) provide enhanced compute performance at the expense of reduced power efficiency; in contrast, E-cores (INTEL) and LITTLE cores (ARM) provide enhanced power efficiency at the expense of reduced compute performance. In this description and the following claims, a processor core designed for enhanced compute performance (e.g., P-cores, big cores) is a "performance core" and a core designed for enhanced power efficiency (e.g., E-cores, LITTLE cores) is an "efficiency core."

Depending on architectural design, processor cores in a heterogeneous processor architecture differ in one or more of their performance capabilities or their instruction set architecture (ISA) capabilities. Processor cores may be heterogeneous in performance capabilities due to differences in their base clock rates, differences in their maximum clock rates, differences in the sizes of their associated caches, differences in the number and/or the types of their available arithmetic logic units (ALUs), differences in their pipeline architectures, and the like. Processor cores may be heterogeneous in ISA capabilities due to differences in the processor instructions they support. For example, performance cores may support a single instruction multiple data (SIMD) instruction ISA extension, while efficiency cores may not. Notably, if processor cores are heterogeneous only in performance capabilities, they are fungible in the workloads they can execute. However, if processor cores are heterogeneous in ISA capabilities, they may not be fungible in the workloads they can execute.

Even when executing at heterogeneous processor architectures in which the processor cores differ in their performance capabilities but have comparable ISA capabilities, contemporary hypervisors make no distinction between available physical processor cores when associating virtual processor cores with physical processor cores. Because contemporary hypervisors treat physical processor cores in these heterogeneous processor architectures as fungible, a guest operating system (OS) lacks knowledge of differences between the physical processor cores with which its virtual processor cores are associated. This lack of knowledge can lead to inefficiencies in how the guest OS assigns its workloads. For example, the guest OS may assign a higher-priority task (e.g., a foreground user-interface task) to a virtual processor core that is associated with an efficiency core and may assign a lower-priority task (e.g., a background data fetching task) to a virtual processor core that is associated with a performance core. These assignments mean that the higher-priority task executes at a physical processor core designed for efficiency, while the higher-priority task executes at a physical processor core designed for performance. This can lead to a degraded user experience (e.g., a poorly performing user interface), waste of energy resources, excessive heat generation, and the like.

In addition, software faults could result if a hypervisor were to treat physical processor cores as fungible in heterogeneous processor architectures in which the processor cores differ in their ISA capabilities. For example, due to a lack of knowledge of the differences between the physical processor cores its virtual processor cores are associated with, a guest OS may assign a task that uses SMID instructions to a virtual processor core that is associated with an efficiency core that lacks SMID execution capabilities. Thus, the task will fail (e.g., generate an exception or crash) when it attempts to execute a SMID instruction.

The described embodiments utilize awareness of heterogeneous processor architectures when associating physical processor cores with VMs. Embodiments determine that a processor system has a heterogeneous set of physical processor cores. For example, a hypervisor determines that a processor system has performance and efficiency cores. Then, when assigning a VM's virtual processor cores to the processor system's physical processor cores, embodiments expose the underlying heterogeneity of the physical processor cores to the VM. Continuing the example, the hypervisor assigns an efficiency core to a first virtual processor core of the VM and exposes the first virtual processor core as an efficiency core. Continuing the example, the hypervisor also assigns a performance core to a second virtual processor core of the VM and exposes the second virtual processor core as a performance core. Because the hypervisor exposed the first virtual processor core as an efficiency core and exposed the second virtual processor core as a performance core, a guest OS executing at the VM can make informed scheduling decisions, which can lead to enhanced user experiences, the efficient use of energy resources, a reduction in heat generation, and the avoidance of software faults.

FIG. 1A illustrates an example 100a of a computer architecture that facilitates mapping a VM's virtual processor cores to heterogeneous physical processor cores of a processing system. In example 100a, the computer architecture includes a computer system 101 comprising hardware 102. Illustrated examples of hardware 102 include a processor system 103. In embodiments, processor system 103 is a CPU comprising one or more processor cores or a plurality of CPUs which each includes one or more processor cores. Regardless of the arrangement of processor system 103, in FIG. 1A, processor system 103 includes a plurality of processor cores. FIG. 1A illustrates these processor cores as physical processor cores 107 (e.g., physical core 107a to physical core 107n, with an ellipsis indicating that there could be any number of physical processor cores 107). For example, each core of physical processor cores 107 is a single-threaded processor core or is one thread of a simultaneous multithreading (SMT) core.

Illustrated examples of hardware 102 also include a memory 104 (e.g., system or main memory), a storage media 105 (e.g., a single computer-readable storage medium or a plurality of computer-readable storage media), and a network interface 106 (e.g., one or more network interface cards). Although not shown, other examples of hardware 102 include a trusted platform module (TPM) for facilitating measured boot features, an input/output (I/O) memory management unit (IOMMU) that connects a direct memory access (DMA)-capable I/O bus (and any devices connected thereto) to memory 104, a graphics processing unit (GPU) for rendering image data, a video display interface for connecting to display hardware, a user input interface for connecting to user input devices, an external bus for connecting to external devices, and the like.

As illustrated in example 100a, a hypervisor 109 executes directly on hardware 102. Hypervisor 109 allocates hardware resources (e.g., processor system 103, memory 104, I/O resources) into a plurality of partitions. In embodiments, these partitions include a host partition 110 within which a host OS (not illustrated) executes. In embodiments, these partitions also include guest partitions 111 within which guest OSs execute (e.g., guest partition 111a executing guest OS 112 to guest partition 111n executing guest OS 113, with an ellipsis indicating that hypervisor 109 could operate any number of guest partitions).

As illustrated, host partition 110 includes a virtualization stack 117, which uses application program interface (API) calls (e.g., hypercalls) to hypervisor 109 to create, manage, and destroy each guest partition of guest partitions 111. In embodiments, virtualization stack 117 makes decisions about which portion(s) of memory 104 to allocate to each guest partition, operates para-virtual drivers that multiplex guest partition access to physical hardware devices (e.g., storage media 105, network interface 106), and facilities limited communications among partitions via a VM bus (not shown), among other things.

In embodiments, hypervisor 109 creates one or more virtual processor cores for each partition. For example, in FIG. 1A, host partition 110 includes virtual processor cores 114. Virtual processor cores 114 include virtual core 114a to virtual core 114n, with an ellipsis indicating that there could be any number of virtual processor cores 114 for host partition 110. In FIG. 1A, guest partition 111a also includes virtual processor cores 115. Virtual processor cores 115 include virtual core 115a to virtual core 115n, with an ellipsis indicating that there could be any number of virtual processor cores 115 for guest partition 111a. In FIG. 1A, guest partition 111n also includes virtual processor cores 116. Virtual processor cores 116 include virtual core 116a to virtual core 116n, with an ellipsis indicating that there could be any number of virtual processor cores 116 for guest partition 111n.

In embodiments, hypervisor 109 uses a processor manager 118 to manage the use of processor system 103 (e.g., physical processor cores 107) by these virtual processor cores. In embodiments, hypervisor 109 coordinates with virtualization stack 117 in managing the use of processor system 103 by virtual processor cores. Thus, in FIG. 1A, processor manager 118 is illustrated as being split between hypervisor 109 (processor manager 118a) and virtualization stack 117 (processor manager 118b), meaning that virtualization stack 117 or hypervisor 109 could perform any of the functionality of processor manager 118 described herein.

In embodiments, hypervisor 109 also allocates a portion of memory 104 to each partition and intercepts and routes any interrupts generated by each partition, among other things. In embodiments, hypervisor 109 uses second-level address translation (SLAT) to isolate memory allocated to each partition created by hypervisor 109 from other partition(s) created by hypervisor 109. For example, hypervisor 109 may use one or more SLAT tables to map system physical addresses (SPAs) in memory 104 to guest physical addresses (GPAs) that make up each partition's memory space.

While the physical processor cores of a processor system have conventionally been homogenous (e.g., identical in terms of capability and performance), in embodiments, physical processor cores 107 are heterogeneous. Thus, in FIG. 1A, physical processor cores are illustrated as having one or more capabilities 108 (e.g., capability 108a for physical core 107a to capability 108n for physical core 107n). In some embodiments, physical processor cores 107 are heterogeneous in their performance capabilities; in these embodiments, capabilities 108 represent physical capabilities that affect each core's performance. Examples of capabilities 108 include base clock rate, maximum clock rate, associated cache size, number of ALUs, type of ALUs, and pipeline architecture. In other embodiments, physical processor cores 107 are heterogeneous in their ISA capabilities; in these embodiments, capabilities 108 represent ISA differences (e.g., different subsets of supported instructions). In embodiments, physical processor cores 107 are heterogeneous in performance and ISA capabilities.

In embodiments, heterogeneity of physical processor cores 107 is exposed to a partition via that partition's virtual processor cores or via an advanced configuration and power interface (ACPI) table associated with the partition. For example, in example 100a, each virtual processor core has an associated feature set (e.g., feature set 119a for virtual core 114a, feature set 119n for virtual core 114n, feature set 120a for virtual core 115a, feature set 120n for virtual core 115n, feature set 121a for virtual core 116a, and feature set 121n for virtual core 116n).

Figure 1B:
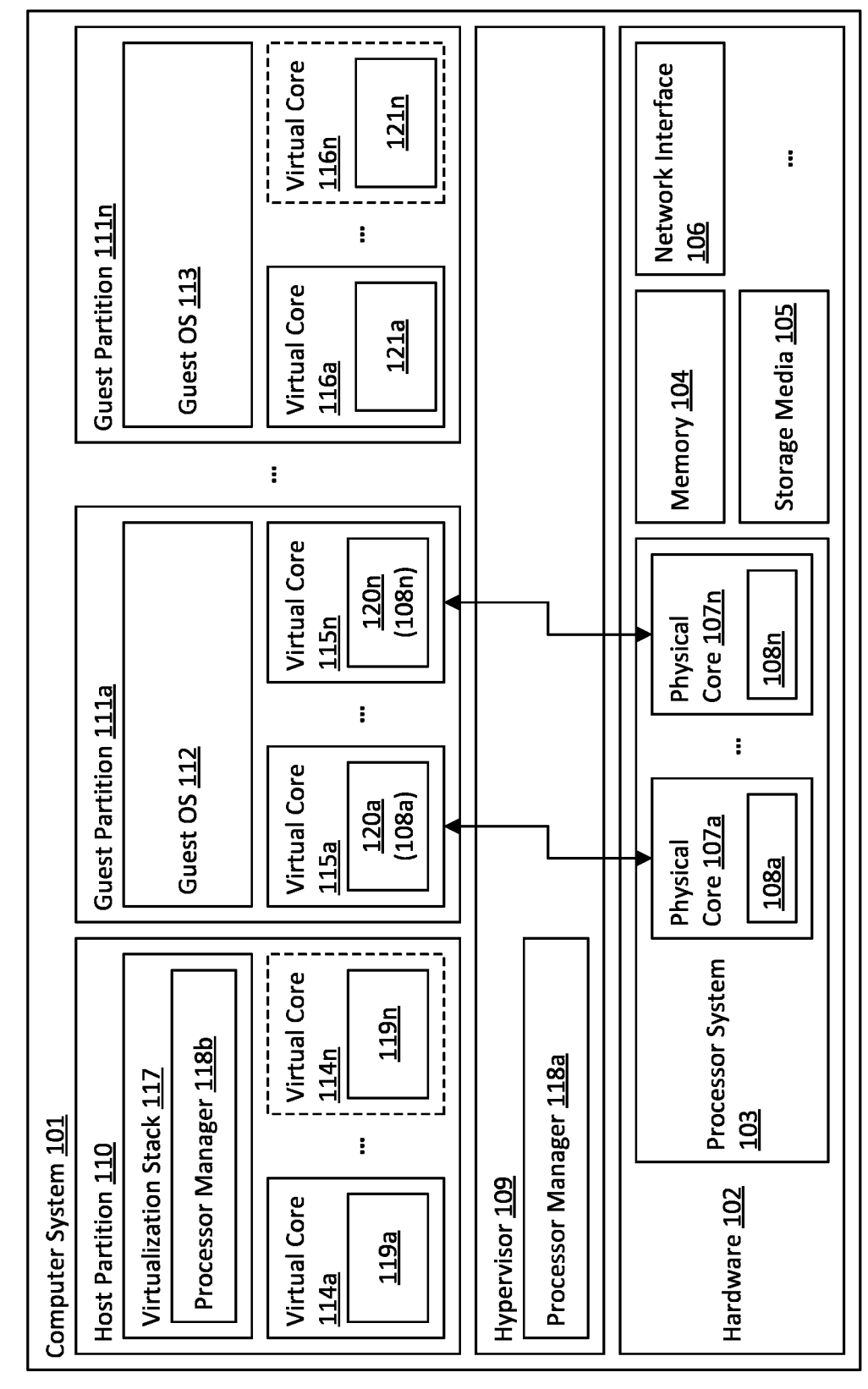
FIG. 1B illustrates an example of a mapping of a VM's virtual processor cores with heterogeneous physical processor cores.

In embodiments, processor manager 118 determines that the physical processor cores 107 of processor system 103 are heterogeneous in their performance capabilities and/or in their ISA capabilities. For example, processor manager 118 determines that one or more of capabilities 108a of physical core 107a are different from capabilities 108n of physical core 107n. Then, when associating a VM's virtual processor cores with physical processor cores 107, processor manager 118 exposes these differences to the VM. For example, FIG. 1B illustrates an example 100b of a mapping of a VM's virtual processor cores with heterogeneous physical processor cores. In example 100b, processor manager 118 has associated virtual core 115a of guest partition 111a with physical core 107a, and processor manager 118 has associated virtual core 115n of guest partition 111a with physical core 107n. As shown in example 100b, feature set 120a for virtual core 115a reflects a capability 108a of physical core 107a, and feature set 120n for virtual core 115n reflects a capability 108n of physical core 107n.

Figure 2:
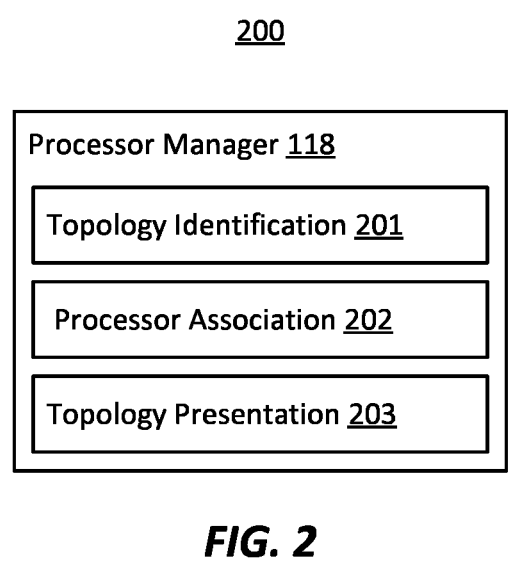

FIG. 2 illustrates an example 200 of processor manager 118 of FIGS. 1A and 1B. Each internal component of processor manager 118 depicted in FIG. 2 represents various functionalities that processor manager 118 might implement in accordance with various embodiments described herein. It will be appreciated, however, that the depicted components—including their identity and arrangement—are presented merely as an aid in describing example embodiments of processor manager 118. In particular, it is noted that, in various implementations, the component of processor manager 118 could be variously arranged between hypervisor 109 (e.g., processor manager 118a) and virtualization stack 117 (e.g., processor manager 118b).

In FIG. 2, processor manager 118 includes a topology identification component 201. In embodiments, topology identification component 201 identifies a topology of processor system 103. In embodiments, topology identification component 201 identifies a heterogeneous processor architecture of processor system 103, such as physical processor cores 107 that are heterogeneous. As mentioned, if processor cores are heterogeneous only in performance capabilities, those cores are fungible in the workloads they can execute. However, if processor cores are heterogeneous in ISA capabilities, those cores may not be fungible in the workloads they can execute. In embodiments, topology identification component 201 also determines if the processor cores of the identified topology are fungible in the workloads they can execute.

In FIG. 2, processor manager 118 also includes a processor association component 202. In embodiments, processor association component 202 manages the association and disassociation of individual virtual processor cores (e.g., virtual processor cores 114, virtual processor cores 115, virtual processor cores 116) with individual physical processor cores (e.g., physical processor cores 107). In some embodiments, processor association component 202 is a scheduler operating at hypervisor 109. In other embodiments, processor association component 202 is a scheduler operating at host partition 110. In these latter embodiments, processor association component 202 is a scheduler of a host OS (e.g., operating at (e.g., part of virtualization stack 117).

In embodiments, if topology identification component 201 determines that the processor cores of the identified topology are fungible in the workloads they can execute (e.g., all the processor cores each support the same set of processor instructions), processor association component 202 keeps a "soft affinity" for associating virtual efficiency cores with physical efficiency cores and for associating virtual performance cores with physical performance cores. In some embodiments, a soft affinity is a preference, but not a requirement, that virtual efficiency cores be associated with physical efficiency cores and that virtual performance cores be associated with physical performance cores. In embodiments, if topology identification component 201 determines that the processor cores of the identified topology are not fungible in the workloads they can execute (e.g., different processor cores support different sets of processor instructions), processor association component 202 keeps a "hard affinity" for associating virtual efficiency cores with physical efficiency cores and for associating virtual performance cores with physical performance cores. In some embodiments, a hard affinity is a requirement that virtual efficiency cores be associated with physical efficiency cores and that virtual performance cores be associated with physical performance cores.

In FIG. 2, processor manager 118 also includes a topology presentation component 203. In embodiments, in connection with the operation of processor association component 202, topology presentation component 203 exposes heterogeneous virtual processor cores to VMs. In one example, topology presentation component 203 exposes heterogeneous virtual processor cores via the capabilities of the virtual cores themselves. Some embodiments expose heterogeneity via each virtual core's CPU identifier (CPUID). For example, if a first virtual processor core is associated with an efficiency core, topology presentation component 203 configures that first virtual processor core with a CPUID of a physical processor core model that is an efficiency core; if a second virtual processor core is associated with a performance core, topology presentation component 203 configures that second virtual processor core with a CPUID of a physical processor core model that is a performance core. In another example, topology presentation component 203 exposes heterogeneous virtual processor cores via ACPI table entries. For example, if a first virtual processor core is associated with an efficiency core, topology presentation component 203 configures an entry within an ACPI table exposed to the VM to indicate that the first virtual processor core is an efficiency core; if a second virtual processor core is associated with a performance core, topology presentation component 203 configures an entry within the ACPI table exposed to the VM to indicate that the second virtual processor core is a performance core.

FIG. 3 illustrates a flow chart of an example method 300 for associating physical processor cores of a physical processor system with virtual processor cores of a VM. In embodiments, instructions for implementing method 300 are encoded as computer-executable instructions (e.g., representing processor manager 118) stored on a computer storage media (e.g., storage media 105) that are executable by a processor (e.g., processor system 103) to cause a computer system (e.g., computer system 101) to perform method 300.

As mentioned, FIG. 1A illustrates processor manager 118 as being split between hypervisor 109 (processor manager 118a) and virtualization stack 117 (processor manager 118b), meaning that virtualization stack 117 or hypervisor 109 could perform any of the functionality of processor manager 118 described herein. Thus, in some embodiments, a scheduler of a host OS (e.g., virtualization stack 117) implements method 300; in other embodiments, a hypervisor (e.g., hypervisor 109) implements method 300. Combinations are also possible.

The following discussion now refers to a method and method acts. Although the method acts are discussed in specific orders or are illustrated in a flow chart as occurring in a particular order, no specific ordering is required unless expressly stated or required because an act is dependent on another act being completed prior to the act being performed.

As shown in FIG. 3, method 300 includes an act 301 of identifying a heterogeneous set of physical cores. In embodiments, act 301 comprises determining that a processor system has a heterogeneous set of physical processor cores. For example, topology identification component 201 determines that processor system 103 includes a heterogeneous set of physical cores: physical processor cores 107. In embodiments, the heterogeneous set of physical processor cores includes a first physical processor core with a first capability and a second physical processor core with a second capability different from the first capability. For example, physical core 107a has a capability 108a, while physical core 107n has a capability 108n.

While various differences between physical core 107a and physical core 107n are possible, in one example, capability 108a differs from capability 108n in a manner that affects the performance of physical core 107a versus physical core 107n. Thus, in embodiments, the first capability is a first performance capability, and the second capability is a second performance capability different from the first performance capability. In one example, the first performance capability is a first available clock rate (e.g., base clock rate, maximum clock rate), and the second performance capability is a second available clock rate different from the first available clock rate. In another example, the first performance capability is a first cache size, and the second performance capability is a second cache size different from the first cache size. In another example, the first performance capability is a first number of ALUs, and the second performance capability is a second number of ALUs different from the first number of ALUs. In another example, the first performance capability is a first pipeline architecture, and the second performance capability is a second pipeline architecture different from the first pipeline architecture.

In another example, capability 108a differs from capability 108n in a manner that affects the ISA of physical core 107a versus physical core 107n. Thus, in embodiments, the first capability is a first ISA capability, and the second capability is a second ISA capability different from the first ISA capability. For example, the first ISA capability is a first set of available processor instructions, and the second ISA capability is a second set of available processor instructions that includes at least one processor instruction (e.g., a SIMD instruction) not present in the first set of available processor instructions.

Method 300 also includes an act 302 of associating physical cores with a VM while exposing heterogeneity of the underlying physical cores. In embodiments, act 302 comprises associating a plurality of physical processor cores with a VM and, when doing so, exposing heterogeneity of the underlying physical processor cores to the VM. For example, processor association component 202 associates a plurality of physical cores of physical processor cores 107 with guest partition 111a, while topology presentation component 203 exposes heterogeneity of those physical processor cores to guest partition 111a.

As shown, act 302 includes an act 303 of associating a first physical core with a first virtual core of the VM while exposing a heterogeneous feature of the first physical core. Act 302 also includes an act 304 of associating a second physical core with a second virtual core of the VM while exposing a heterogeneous feature of the second physical core. FIG. 3 specifies no ordering between act 303 and act 304. Thus, in embodiments, act 303 and act 304 are performed serially (in either order) or at least partially in parallel.

In embodiments, act 303 comprises associating the first physical processor core with a first virtual processor core of the VM. For example, processor association component 202 associates physical core 107a with virtual core 115a. In embodiments, act 303 also comprises, based on the first physical processor core having the first capability, exposing to the VM that the first virtual processor core has a first feature set. In some embodiments, the first feature set indicates that the first physical processor core is an efficiency core. In one example, topology presentation component 203 exposes virtual core 115a as having feature set 120a corresponding to capability 108a (e.g., by associating a first CPUID with virtual core 115a, the first CPUID corresponding to a physical processor core model that is an efficiency core). In another example, topology presentation component 203 exposes a feature set corresponding to capability 108a to the VM via a first ACPI table entry.

In embodiments, act 304 comprises associating the second physical processor core with a second virtual processor core of the VM. For example, processor association component 202 associates physical core 107n with virtual core 115n. In embodiments, act 303 also comprises, based on the second physical processor core having the second capability, exposing to the VM that the second virtual processor core has a second feature set different from the first feature set. In some embodiments, the first feature set indicates that the first physical processor core is a performance core. In one example, topology presentation component 203 exposes virtual core 115n as having feature set 120n corresponding to capability 108n (e.g., by associating a second CPUID with virtual core 115n, the second CPUID corresponding to a physical processor core model that is a performance core). In another example, topology presentation component 203 exposes a feature set corresponding to capability 108n to the VM via a second ACPI table entry different from the first ACPI table entry.

In embodiments, VMs that utilize heterogeneous processor topologies are migrated from one VM host node to another VM host node (e.g., from computer system 101 to another similarly configured computer system). Conventionally, VM migration involved determining if a target VM host node had at least one physical processor core supporting a superset of features utilized by the virtual processor cores of the VM being migrated. Because conventional VMs had homogenous virtual processor cores, this was a single determination (e.g., a single virtual processor core type). In embodiments, migration of VMs that utilize a heterogeneous processor topology includes determining, for each virtual processor core type within a heterogeneous set of virtual processor cores, whether the target VM host node comprises at least one physical processor having a superset of features that by that cores' type. Thus, in some embodiments, method 300 includes migrating the VM to a target computer system and determining if the target computer system comprises a target processor system supporting the first capability and the second capability.

Embodiments of the disclosure may comprise or utilize a special-purpose or general-purpose computer system (e.g., computer system 101) that includes computer hardware, such as, for example, a processor system (e.g., processor system 103) and system memory (e.g., memory 104), as discussed in greater detail below. Embodiments within the scope of the present disclosure also include physical and other computer-readable media for carrying or storing computer-executable instructions and/or data structures. Such computer-readable media can be any available media that are accessible by a general-purpose or special-purpose computer system. Computer-readable media that store computer-executable instructions and/or data structures are computer storage media (e.g., storage media 105). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links that can be used to carry program code in the form of computer-executable instructions or data structures, and which can be accessed by a general-purpose or special-purpose computer system. A "network" is defined as one or more data links that enable the transport of electronic data between computer systems and other electronic devices. When information is transferred or provided over a network or another communications connection (either hardwired, wireless, or a combination of hardwired or wireless) to a computer system, the computer system may view the connection as transmission media. Combinations are included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 106) and then eventually transferred to computer system RAM and/or to less volatile computer storage media at a computer system. Thus, computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a function or group of functions. Computer-executable instructions may be, for example, binaries, intermediate format instructions such as assembly language, or even source code.

It will be appreciated that the disclosed systems and methods may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (Saas), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts capable of running one or more virtual machines. During operation, virtual machines emulate an operational computing system, supporting an OS and perhaps one or more other applications. In some embodiments, each host includes a hypervisor that emulates virtual resources for the virtual machines using physical resources that are abstracted from the view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor system, comprising:
determining that the processor system has a heterogeneous set of physical processor cores, the heterogeneous set of physical processor cores including,
a first physical processor core with a first instruction set architecture (ISA) having a first set of available processor instructions, and
a second physical processor core with a second ISA having a second set of available processor instructions that includes at least one processor instruction not present in the first set of available processor instructions;
associating a plurality of physical processor cores with a virtual machine (VM), including:
associating the first physical processor core with a first virtual processor core of the VM, including, based on the first physical processor core having the first ISA, exposing to the VM that the first virtual processor core has a first feature set; and
associating the second physical processor core with a second virtual processor core of the VM, including, based on the second physical processor core having the second ISA, exposing to the VM that the second virtual processor core has a second feature set different from the first feature set; and
determining, prior to migrating the VM to a target computer system, that the target computer system comprises a target processor system supporting both the first ISA and the second ISA.

2. The method of claim 1, wherein,
the first physical processor core has a first performance capability; and
the second physical processor core has is a second performance capability different from the first performance capability.

3. The method of claim 2, wherein, the first performance capability is at least one of a first available clock rate, a first cache size, a first number of arithmetic logic units (ALUs), or a first pipeline architecture; and the second performance capability is at least one of a second available clock rate different from the first available clock rate, a second cache size different from the first cache size, a second number of ALUs different from the first number of ALUs, or a second pipeline architecture different from the first pipeline architecture.

4. The method of claim 2, wherein, the first feature set indicates an efficiency core; and the second feature set indicates a performance core.

5. The method of claim 1, wherein, exposing to the VM that the first virtual processor core has the first feature set comprises associating a first central processing unit identifier (CPUID) with the first virtual processor core; and exposing to the VM that the second virtual processor core has the second feature set comprises associating a second CPUID with the second virtual processor core, the second CPUID being different from the first CPUID.

6. The method of claim 1, wherein, exposing to the VM that the first virtual processor core has the first feature set comprises presenting a first advanced configuration and power interface (ACPI) table entry to the VM; and exposing to the VM that the second virtual processor core has the second feature set comprises presenting a second ACPI table entry to the VM, the second ACPI table entry being different from the first ACPI table entry.

7. The method of claim 1, wherein the method is implemented by a scheduler of a host operating system.

8. The method of claim 1, wherein the method is implemented by a hypervisor.

9. A computer system comprising:

a processor system that comprises a heterogeneous set of physical processor cores, the heterogeneous set of physical processor cores including, a first physical processor core with a first instruction set architecture (ISA) having a first set of available processor instructions, and a second physical processor core with a second ISA having a second set of available processor instructions that includes at least one processor instruction not present in the first set of available processor instructions; and a computer storage medium that stores computer-executable instructions that are executable by the processor system to at least:

associate the first physical processor core with a first virtual processor core of a virtual machine (VM), including, based on the first physical processor core having the first ISA, exposing to the VM that the first virtual processor core has a first feature set;

associate the second physical processor core with a second virtual processor core of the VM, including, based on the second physical processor core having the second ISA, exposing to the VM that the second virtual processor core has a second feature set different from the first feature set; and determine, prior to migrating the VM to a target computer system, that the target computer system comprises a target processor system supporting both the first ISA and the second ISA.

10. The computer system of claim 9, wherein, the first physical processor core has a first performance capability; and the second physical processor core has is a second performance capability different from the first performance capability.

11. The computer system of claim 10, wherein, the first performance capability is at least one of a first available clock rate, a first cache size, a first number of arithmetic logic units (ALUs), or a first pipeline architecture; and the second performance capability is at least one of a second available clock rate different from the first available clock rate, a second cache size different from the first cache size, a second number of ALUs different from the first number of ALUs, or a second pipeline architecture different from the first pipeline architecture.

12. The computer system of claim 10, wherein, the first feature set indicates an efficiency core; and the second feature set indicates a performance core.

13. The computer system of claim 9, wherein, exposing to the VM that the first virtual processor core has the first feature set comprises associating a first central processing unit identifier (CPUID) with the first virtual processor core; and exposing to the VM that the second virtual processor core has the second feature set comprises associating a second CPUID with the second virtual processor core, the second CPUID being different from the first CPUID.

14. The computer system of claim 9, wherein, exposing to the VM that the first virtual processor core has the first feature set comprises presenting a first advanced configuration and power interface (ACPI) table entry to the VM; and exposing to the VM that the second virtual processor core has the second feature set comprises presenting a second ACPI table entry to the VM, the second ACPI table entry being different from the first ACPI table entry.

15. The computer system of claim 9, wherein the computer-executable instructions are part of a scheduler of a host operating system, or a hypervisor.

16. A computer program product comprising a computer storage medium that stores computer-executable instructions that are executable by a processor system to at least:

identify a first physical processor core of the processor system that has a first instruction set architecture (ISA) having a first set of available processor instructions;

associate the first physical processor core with a first virtual processor core of a virtual machine (VM), including, based on the first physical processor core having the first ISA, exposing to the VM that the first virtual processor core has a first feature set;

identify a second physical processor core of the processor system that has a second ISA having a second set of available processor instructions that includes at least one processor instruction not present in the first set of available processor instructions;

associate the second physical processor core with a second virtual processor core of the VM, including, based on the second physical processor core having the second ISA, exposing to the VM that the second virtual processor core has a second feature set different from the first feature set; and determine, prior to migrating the VM to a target computer system, that the target computer system comprises a target processor system supporting both the first ISA and the second ISA.

17. The computer program product of claim 16, wherein, the first physical processor core has a first performance capability; and the second physical processor core has a second performance capability different from the first performance capability.

18. The computer program product of claim 17, wherein, the first performance capability is at least one of a first available clock rate, a first cache size, a first number of arithmetic logic units (ALUs), or a first pipeline architecture; and the second performance capability is at least one of a second available clock rate different from the first available clock rate, a second cache size different from the first cache size, a second number of ALUs different from the first number of ALUs, or a second pipeline architecture different from the first pipeline architecture.

19. The computer program product of claim 17, wherein, the first feature set indicates an efficiency core; and the second feature set indicates a performance core.

20. The computer program product of claim 16, wherein, exposing to the VM that the first virtual processor core has the first feature set comprises associating a first central processing unit identifier (CPUID) with the first virtual processor core; and exposing to the VM that the second virtual processor core has the second feature set comprises associating a second CPUID with the second virtual processor core, the second CPUID being different from the first CPUID.

\* \* \* \* \*